W. TURNBULL.
BRAKE MECHANISM FOR CHAIN TRACK VEHICLES.
APPLICATION FILED JAN. 7, 1919.
1,407,964.
Patented Feb. 28, 1922.
2 SHEETS—SHEET 2.
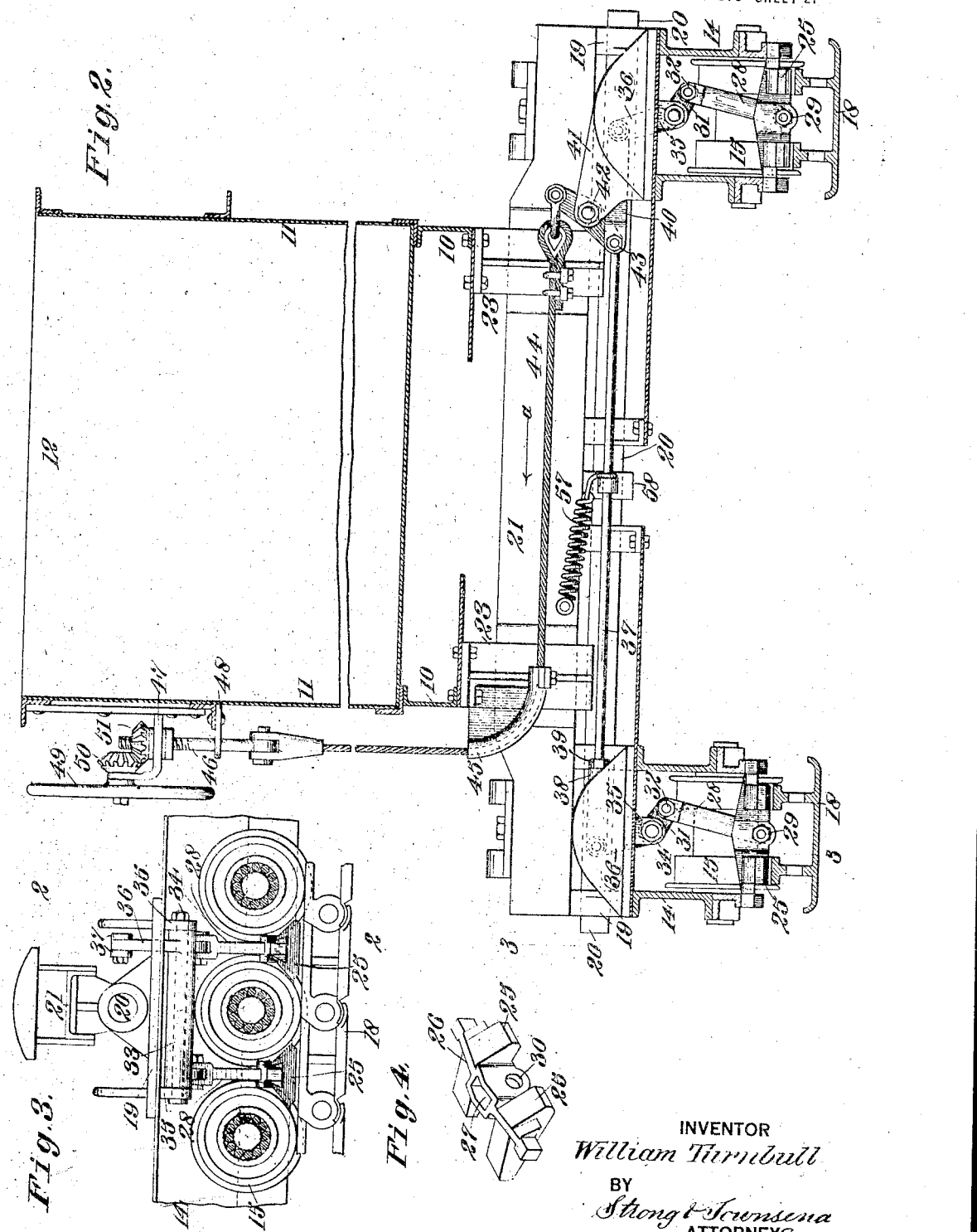
INVENTOR
William Turnbull
BY
Strong & Townsend
ATTORNEYS

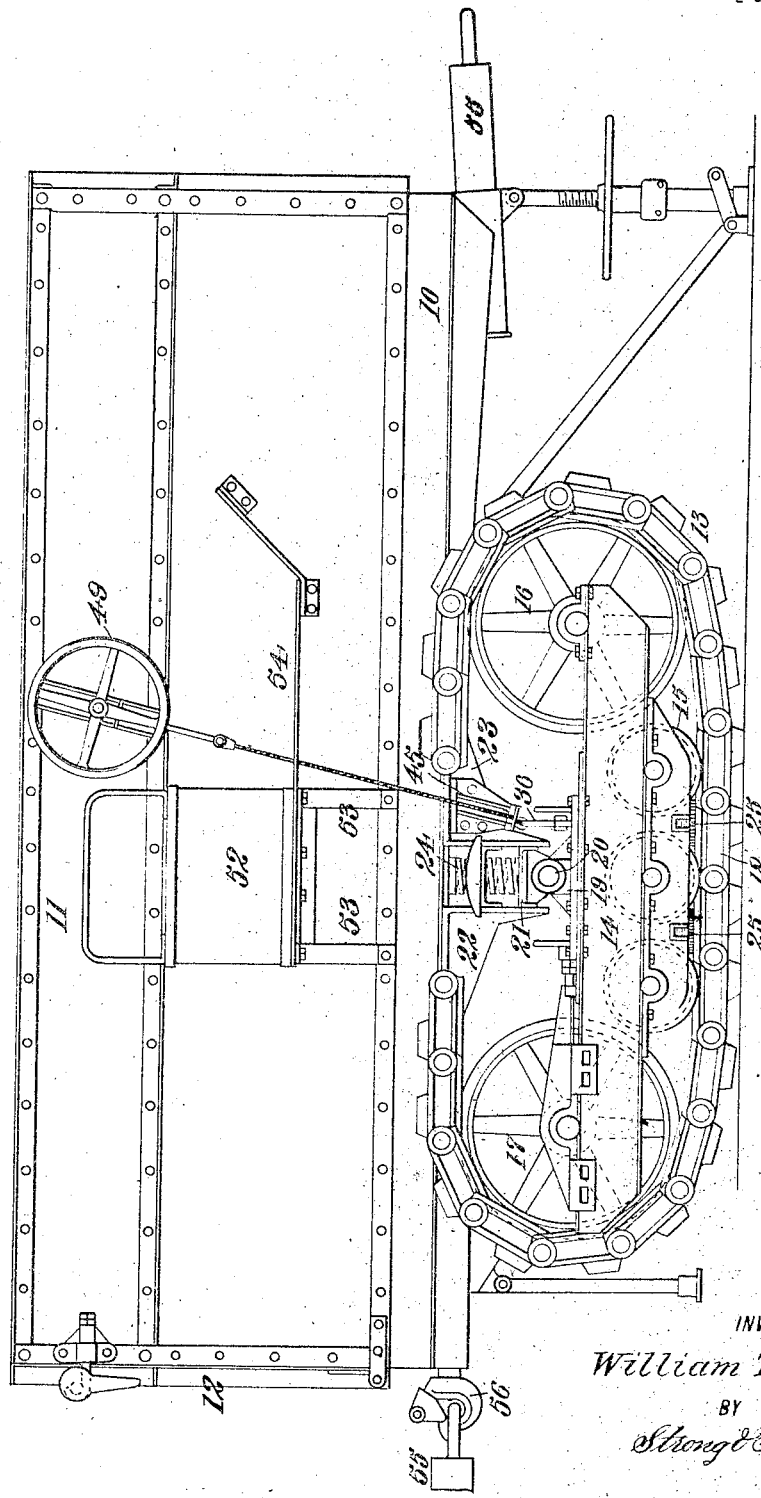

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

BRAKE MECHANISM FOR CHAIN TRACK VEHICLES.

1,407,964.  Specification of Letters Patent.  Patented Feb. 28, 1922.

Application filed January 7, 1919. Serial No. 270,038.

*To all whom it may concern:*

Be it known that I, WILLIAM TURNBULL, a citizen of the United States, residing at Peoria, in the county of Peoria and State of Illinois, have invented new and useful Improvements in Brake Mechanism for Chain Track Vehicles, of which the following is a specification.

This invention relates to a braking mechanism or a brake attachment for chain track vehicles. In its present embodiment, it has been shown as applied to trailer wagons but manifestly its use is not limited to any special type or design of self-laying track vehicle.

When trailers are connected together in train and by a tractor over irregular and unlevel terrain it has been quite difficult to maintain control of the various trailer wagons, due to conditions which act to divert the individual wagon from the course of travel described by the tractor.

It has been one principal object of the invention to provide means for individually controlling the movement of a trailer and thus insuring that it will not break loose from the train or run into the preceding trailers thereof, to throw them out of their proper position.

Other objects will appear hereinafter.

The invention is illustrated by way of example in the accompanying drawings, in which—

Fig. 1 indicates the completely assembled trailer with a portion of its running gear broken away to more clearly disclose the control mechanism.

Fig. 2 is a view in vertical section illustrating the brake mechanism and the control thereof.

Fig. 3 is a view in section and elevation as seen on the line 3—3 of Fig. 2.

Fig. 4 is a view in perspective disclosing one of the brake shoes used in the present invention.

Referring to the drawings, 10 indicates a main frame. Mounted upon this main frame is a rectangular body 11, preferably of metal construction and formed with an end gate 12, for convenience in loading. Supporting the trailer and disposed along opposite sides thereof at a point substantially midway its length are self-laying chain track units 13. The truck units consist of roller truck frames 14 beneath which load-supporting rollers 15 are mounted and at the opposite ends of which idler wheels 16 and 17 are rotatably disposed.

Embracing the elements previously indicated is a chain track 18 which passes around the idlers and upon which the truck rollers 15 are adapted to constantly rest. The truck frames 14 are provided with standards 19, substantially midway their length, through which a cross-wise extending stabilizer shaft 20 extends beneath the main frame 10 of the trailer. A cross beam 21 is mounted in connection with the stabilizer shaft and affords a vertical guide therefor as it slides between hangers 22 and 23. These hangers are fixed in spaced relation to each other and project downwardly from the opposite side rails of the main frame. Helical springs 24 are interposed between the main frame and the cross beam and thus allow said beam yieldably vertical movement, this structure at the same time permitting individual vertical pivotal movement of the separate truck units as well as bodily movement. This truck mounting forms the subject matter of another application, Serial No. 270,039, filed concurrently herewith.

Reference being had to Figure 3 it will be noted that the truck rollers 15 are spaced in relation to each other and thus provide a triangular opening within which brake shoes 25 may be positioned. One of these shoes is clearly shown in Figure 4 as having a central rib 26 at the opposite ends of which the complementary shoes 25 are formed. These shoes have upper angular faces adapted to clear the periphery of the rollers 15 and flat under faces adapted to be brought to bear upon the chain track 18.

A link opening 27 is formed in the central web 26 and is provided to receive a draw link 28. This link is pivoted within the opening by means of a bolt 29 passing through the bolt opening 30 of the web. The link 28 extends upwardly and at an angle to the vertical and there engages the free end of a crank lever 31, it being pivotally secured thereto by a bolt 32. The crank lever is one of a plurality of such levers which are formed integral with a sleeve 33 carried upon a shaft 34. This shaft is supported by brackets 35 at the opposite ends of the sleeve. These brackets are in turn secured to the body casting of the truck frames and extend downwardly between the channel elements thereof. The sleeve 33 is formed with an upwardly extending lever arm 36 to which is connected a brake rod 37. The brake rod extends transversely of the main frame and therebeneath, passing from one of the truck units to a point adjacent the other. It is connected to one of the levers 36 by means of a yoke 38 and an adjusting nut 39, and to the other lever by means of a shackle bar 40, the shackle bar 40 is interposed between the end of the lever and the end of the rod 37, being pivoted to both of said members.

An operating crank is carried upon a bracket 41 on one of the truck frames and by a pivot bolt 42. This crank has a downwardly extending arm pivoted to a bolt 43 which also forms a connection between the brake rod 37 and the shackle member 40. The upper end of the crank is connected with a draw cable 44 which passes across and beneath the main frame and upwardly through an angle guide 45 to be connected to a screw shaft 46. The shaft 46 is carried upon suitable brackets 47 and 48 fixed to the side of the body of the trailer and is adapted to be moved vertically by means of a hand-wheel 49. This wheel is fitted with a bevel gear 50 in constant mesh with a gear 51 mounted upon the shaft 46, it being understood that the opening through the gear 51 is threaded to agree with the external threads upon the shaft, and that by rotation of the gear 51 the shaft 46 may be raised or lowered as desired. In the present instance the brackets 47 and 48 are disposed in convenient relation to a seat 52. This seat is designed to accommodate an operator, one of which is assigned to each of the trailers. The seat is of the box type and is carried by suitable brackets 53 extending outwardly from the body, beneath the seat. A foot board 54 extends forwardly from the seat and thus conveniently supports the operator and allows him to manipulate the hand-wheel 49 to apply or release the brake members 25 from engagement with the lower run of the chain track.

In operation a series of trailers are connected by their draw bars 55 and suitable coupling hooks 56 to each other and the tractor. An attendant is assigned to each of the trailers and occupies the seat 52. When the train is passing along level ground no attention need be given the running gear. However, on down grades the individual operators must rotate the hand-wheel 49 to draw upon the cables 44 in the direction of the arrow A as indicated in Figure 2.

Due to the fact that the lever 31 and the links 28 form a toggle joint this drawing movement of the cable will force the lower ends of both of said levers downwardly with great pressure and will cause the brake shoes 25 to bear upon the upper faces of the chain track. The pressure exerted may be varied as desired. When the hand-wheel is operated to release the cable a contraction spring 57 will act against a collar 58 upon the brake rod 37 to restore the toggle joints to their original position and the shoes out of engagement with the track.

While I have shown the preferred form of my invention as now known to me it will be understood that various changes in the combination and construction, and arrangement of parts, may be made by those skilled in the art, without departing from the spirit of the invention as claimed.

Having thus described my invention, what I claim and desire to secure by Letters Patent is—

1. In a chain track vehicle, a truck mechanism including a roller carrying frame made up of spaced side plates, and an endless flexible track upon which the rollers operate, a brake shoe carried by the roller frame, guide members on the side plates of the frame in which the brake shoe is vertically movable, and operating mechanism to depress the shoe into frictional engagement with the track whereby to retard movement.

2. In a chain track vehicle, a truck mechanism including a roller carrying frame made up of spaced side plates, and an endless flexible track upon which the rollers operate, a brake shoe carried by the roller frame, guide members on the side plates of the frame in which the brake shoe is vertically movable and toggle mechanism for depressing the shoe into frictional engagement with the track whereby to retard movement.

3. In a vehicle, a main frame, a truck mechanism at each side thereof including a roller carrying frame and an endless track on which the rollers operate, a brake shoe carried by each roller frame for cooperation with the lower run of the track, mechanism for each shoe operative to raise and lower the same, a transverse rod connecting opposite raising and lowering mechanisms, and means carried by the main frame for imparting reciprocating movement to the rod whereby to actuate the raising and lowering mechanisms.

4. In a vehicle, a main frame, a truck mechanism at each side thereof including a roller carrying frame and an endless track on which the rollers operate, a brake shoe carried by each of the roller frames for co-operation with the lower run of the track, a bell-crank lever mounted on each truck frame, a toggle link connecting each bell crank with the adjacent shoe, a transverse rod connecting opposite bell-crank levers together, and means for imparting reciprocating movement to the rod whereby to actuate the brake shoes.

WILLIAM TURNBULL.